US011265669B2

(12) United States Patent
Cardinaux et al.

(10) Patent No.: US 11,265,669 B2
(45) Date of Patent: Mar. 1, 2022

(54) ELECTRONIC DEVICE, METHOD AND COMPUTER PROGRAM

(71) Applicant: Sony Corporation, Tokyo (JP)

(72) Inventors: Fabien Cardinaux, Stuttgart (DE); Michael Enenkl, Stuttgart (DE); Marc Ferras Font, Stuttgart (DE); Franck Giron, Stuttgart (DE); Thomas Kemp, Stuttgart (DE); Patrick Putzolu, Stuttgart (DE); Andreas Schwager, Stuttgart (DE); Stefan Uhlich, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/977,817

(22) PCT Filed: Mar. 8, 2019

(86) PCT No.: PCT/EP2019/055875

§ 371 (c)(1),
(2) Date: Sep. 3, 2020

(87) PCT Pub. No.: WO2019/170874

PCT Pub. Date: Sep. 12, 2019

(65) Prior Publication Data

US 2020/0404443 A1 Dec. 24, 2020

(30) Foreign Application Priority Data

Mar. 8, 2018 (EP) .................................... 18160650

(51) Int. Cl.
*H04S 7/00* (2006.01)
*G06T 7/73* (2017.01)
(Continued)

(52) U.S. Cl.
CPC .......... *H04S 7/303* (2013.01); *G06K 9/00832* (2013.01); *G06T 7/74* (2017.01);
(Continued)

(58) Field of Classification Search
CPC ..... H04S 7/303; H04S 2420/13; H04R 1/403; H04R 3/12; H04R 2201/401;
(Continued)

(56) References Cited

U.S. PATENT DOCUMENTS 6,748,086 B1 * 6/2004 Venkatesh ............ H04M 9/082 381/71.4
9,881,632 B1 * 1/2018 Every .................... H04R 3/005
(Continued)

FOREIGN PATENT DOCUMENTS

DE 102012004690 B4 11/2016
EP 1850640 A1 10/2007
(Continued)

OTHER PUBLICATIONS

International Search Report and Written Opinion dated May 10, 2019 for PCT/EP2019/055875 filed on Mar. 8, 2019, 9 pages.
(Continued)

*Primary Examiner* — Jason R Kurr
(74) *Attorney, Agent, or Firm* — Xsensus LLP

(57) ABSTRACT

An electronic device comprising circuitry configured to obtain an audio signal of a first passenger of a vehicle and to control a loudspeaker array to generate at least one virtual sound source that reproduces the audio signal obtained from the first passenger, the virtual sound source being provided for a second passenger.

20 Claims, 9 Drawing Sheets

1 SP1 SP2 M1 M2 210 SP10 P1 SP3 S1 SP9 200 S2 SP4 P2 S3 S4 SP5 SP8 SP7 SP6

(51) Int. Cl.
*G06K 9/00* (2022.01)
*H04R 1/40* (2006.01)
*H04R 3/12* (2006.01)

(52) U.S. Cl.
CPC ............... *H04R 1/403* (2013.01); *H04R 3/12* (2013.01); *G06T 2207/30196* (2013.01); *G06T 2207/30268* (2013.01); *H04R 2201/401* (2013.01); *H04R 2430/20* (2013.01); *H04R 2499/13* (2013.01); *H04S 2420/13* (2013.01)

(58) Field of Classification Search
CPC .. H04R 2430/20; H04R 2499/13; G06T 7/74; G06T 2207/30196; G06T 2207/30268; G06K 9/00832
See application file for complete search history.

(56) References Cited

U.S. PATENT DOCUMENTS 10,684,811 B2 * 6/2020 Monroe .................. B60Q 3/10
2015/0055807 A1 * 2/2015 Stepputat ................. H04S 5/02 381/302
2016/0029111 A1 1/2016 Wacquant et al.
2016/0037282 A1 2/2016 Giron
2016/0119712 A1 * 4/2016 Tzirkel-Hancock ... H04R 1/406 381/86
2016/0183025 A1 6/2016 Layton et al.
2016/0185290 A1 6/2016 Someda et al.
2020/0077221 A1 * 3/2020 Tammam ................ H04R 5/04

FOREIGN PATENT DOCUMENTS

WO 2013/144269 A1 10/2013
WO 2015/130283 A1 9/2015

OTHER PUBLICATIONS

Blommer, M. and Greenberg, J., "Realistic 3D Sound Simulation in The Virttex Driving Simulator," DSC North America 2003 Proceedings, Dearborn, Michigan, ISSN 1546-5071, Oct. 8-10, 2003, 13 pages.

* cited by examiner

ELECTRONIC DEVICE, METHOD AND COMPUTER PROGRAM

CROSS-REFERENCE TO RELATED APPLICATIONS

The present application is based on PCT filing PCT/EP2019/055875, filed Mar. 8, 2019, which claims priority to EP 18160650.0, filed Mar. 8, 2018, the entire contents of each are incorporated herein by reference.

TECHNICAL FIELD

The present disclosure generally pertains to the field of vehicle audio, in particular to devices, methods and computer programs for vehicle audio.

TECHNICAL BACKGROUND

Vehicle audio such as AM/FM and Digital Radio, CD, Navigation is equipment installed in a car or other vehicle to provide in-car entertainment and information for the vehicle occupants.

There exist 3D audio systems that are optimized for in-car use. Such systems are typically based on cross-talk cancellation techniques to control the sound arriving at each of the listener's ears. The low acoustic power requirements and well defined listener locations are beneficial to the optimization of such in-car systems.

Although 3D audio systems exist that are optimized for in-car use, it is generally desirable to improve techniques for 3D audio.

SUMMARY

According to a first aspect, the disclosure provides an electronic device comprising circuitry configured to obtain an audio signal of a first passenger of a vehicle and to control a loudspeaker array to generate at least one virtual sound source that reproduces the audio signal obtained from the first passenger, the virtual sound source being provided for a second passenger.

According to a further aspect, the disclosure provides a method to obtain an audio signal of a first passenger of a vehicle and to control a loudspeaker array to generate at least one virtual sound source that reproduces the audio signal obtained from the first passenger, the virtual sound source being provided for a second passenger.

According to a further aspect, the disclosure provides a computer program to obtain an audio signal of a first passenger of a vehicle and to control a loudspeaker array to generate at least one virtual sound source that reproduces the audio signal obtained from the first passenger, the virtual sound source being provided for a second passenger.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
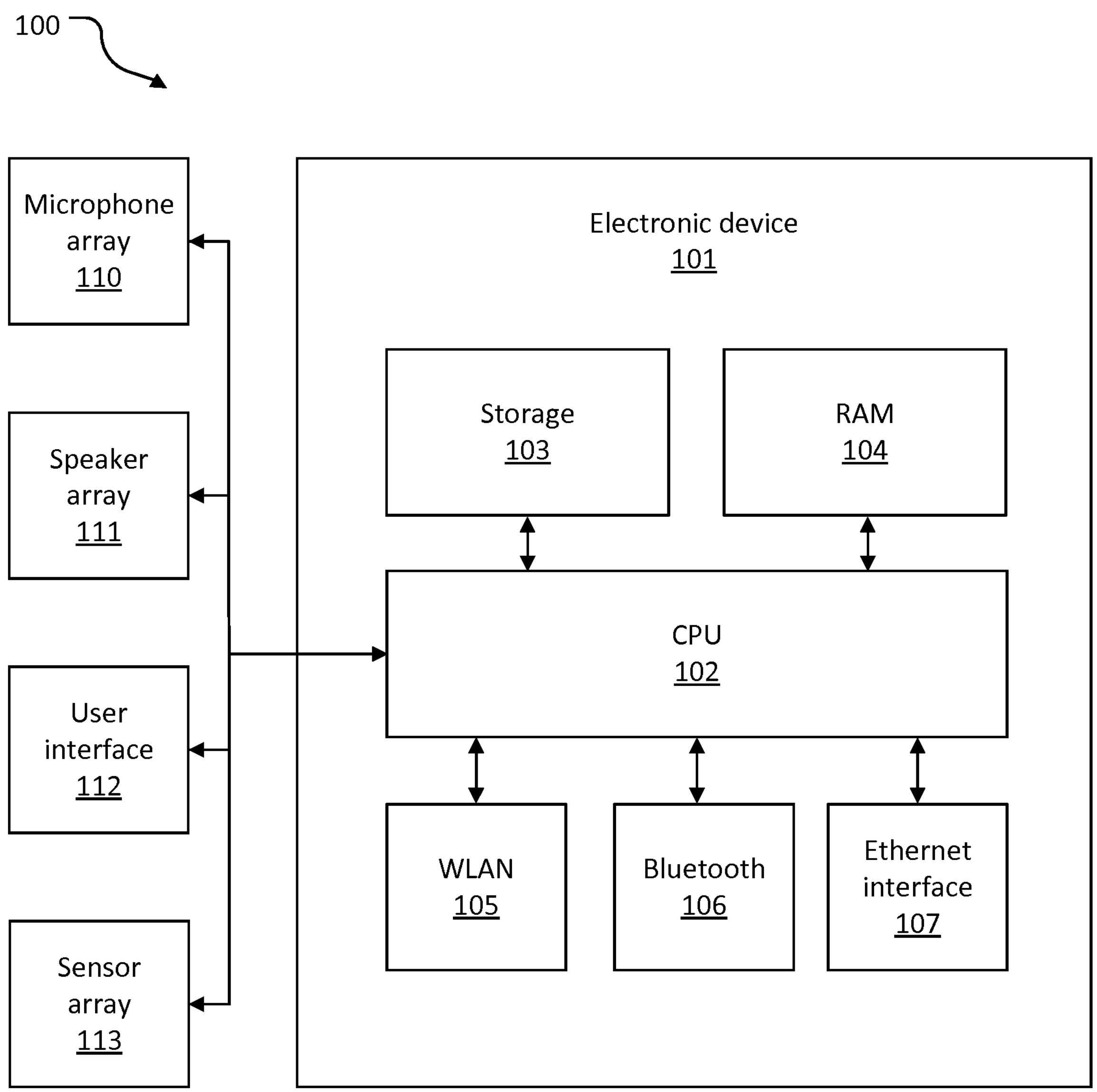
FIG. 1 schematically describes an embodiment of a vehicle audio system with an electronic device that improves passenger voice communication.

Voice communication between a passenger at the front and a passenger at the back inside a vehicle may be difficult. The main reason is the unnatural setting for communication where the front passenger is talking and listening to the back passenger while turned in the opposite direction.

The embodiments described below provide an electronic device comprising circuitry configured to obtain an audio signal of a first passenger of a vehicle and to control a loudspeaker array to generate at least one virtual sound source that reproduces the audio signal obtained from the first passenger, the virtual sound source being provided for a second passenger.

The electronic device may for example be an electronic control unit (ECU). ECUs are typically used in vehicles e.g. as a Door Control Unit (DCU), an Engine Control Unit (ECU), an Electric Power Steering Control Unit (PSCU), a Human-Machine Interface (HMI), Powertrain Control Module (PCM), a Seat Control Unit, a Speed Control Unit (SCU), a Telematic Control Unit (TCU), a Transmission Control Unit (TCU), a Brake Control Module (BCM; ABS or ESC), a Battery Management System (BMS), and/or a 3D audio rendering system. The electronic device may be an ECU that is specifically used for the purpose of controlling a vehicle audio system. Alternatively, an ECU that performs any of the functions described above may be used simultaneously for the purpose of controlling a vehicle audio system.

Circuitry of the electronic device may include a processor, a memory (RAM, ROM or the like), a memory and/or storage, interfaces, etc. Circuitry may comprise or may be connected with input means (mouse, keyboard, camera, etc.), output means (display (e.g. liquid crystal, (organic) light emitting diode, etc.)), loudspeakers, etc., a (wireless) interface, etc., as it is generally known for electronic devices (computers, smartphones, etc.). Moreover, circuitry may comprise or may be connected with sensors for sensing still images or video image data (image sensor, camera sensor, video sensor, etc.), for sensing environmental parameters (e.g. radar, humidity, light, temperature), etc.

The first passenger from whom an audio signal is obtained may be any person in the vehicle that is producing an audio signal (e.g. voice), e.g. a speaker, and the second passenger may be any person in the vehicle that is receiving the audio signal, e.g. a listener. More preferably the first passenger may be a person that is sitting in a front seat of the vehicle, such as a driver or a co-driver, and the second passenger may be a person that is sitting at a rear seat of the vehicle.

The virtual sound source may for example be associated with the second passenger based on the presence and/or location of the second passenger. An algorithm and sensor means may be used to obtain the presence and location of the second passenger and associate the virtual sound source to the second passenger.

The vehicle may be a mobile machine that transports people or cargo. The vehicle may be a wagon, a car, a truck, a bus, a railed vehicle (train, tram), a watercraft (ship, boat), an aircraft or a spacecraft.

The virtual sound source may, for example, be a sound field which gives the impression that a sound source is located in a predefined space. For example, the use of virtual sound sources may allow the generation of spatially limited audio signal. In particular, generating virtual sound sources may be considered as a form of generating virtual speakers throughout the three-dimensional space, including behind, above, or below the listener.

The vehicle may comprise a loudspeaker array for generating the virtual sound source. The speaker array may be composed of loudspeakers distributed over the interior of the vehicle.

By controlling a loudspeaker array to generate at least one virtual sound source that reproduces the audio signal obtained from the first passenger, the electronic device may improve passenger communication in a vehicle.

According to the embodiments, the electronic device may be configured to obtain the audio signal of the first passenger from one or more microphones located in the vehicle The microphones may be individually provided for each of the passengers or may be common microphones provided for each bench of the passengers. For example, a common microphone may be provided at a front bench of the vehicle, and another common microphone may be provided at rear bench of the vehicle.

According to an embodiment, the circuitry is configured to provide the virtual sound source at the location of the first passenger.

For example, the virtual sound source may be located at the head position of the first passenger. The head position of the first passenger may be obtained through video cameras. Video cameras such as monitoring the driver not to drop into sleeping mode may be reused.

According to embodiments, the virtual sound source is configured to alter a directivity pattern of the first passenger's voice to give the impression that the first passenger has turned his head.

The original speech of the first passenger and the sound emitted by the virtual sound source are thus overlaid so that the impression may arise that the driver's voice is not amplified but just turning his head to passengers in the back of the vehicle and his speech can be understood clearly by the passengers in the back of the vehicle.

According to the embodiments, the circuitry may be configured to provide the virtual sound source for the second passenger based on the presence of the second passenger at a seat of the vehicle. The circuitry may for example be configured to obtain presence data from a sensor that is located at the seat of the second passenger. The sensor may be an occupancy sensor that is detecting the motion of the passenger. The occupancy sensors may use infrared, ultrasonic, microwave, or other technology. The sensor may also be a Passive Infrared Sensor (PIR sensors), environmental sensors, such as temperature, humidity and $CO_2$ sensors, Ultrasonic sensors, Microwave sensors and/or pressure sensors.

According to the embodiments, the circuitry may be configured to provide the virtual sound source for the second passenger based on the position and orientation of the head of the second passenger.

For example, the circuitry of the electronic device may be configured to associate the virtual sound source with a second passenger based not only on the presence of the passenger but also on the head position and orientation of the second passenger.

A viewing direction of the second passenger may be obtained from a video camera, and the head position and orientation of the second passenger may be calculated by a face recognition algorithm. Based on the obtained head position and orientation, a virtual sound source for the second passenger can be positioned.

The circuitry may be configured to obtain a head position and/or orientation data of the second passenger from a video camera.

The circuitry may be configured to position the virtual sound source for the second passenger in a predefined distance from the head of the second passenger. The predefined distance may be arbitrarily chosen and may for example be 10 cm or 1 m. The distance may also been chosen based on features of the head of the second passenger.

According to the embodiments, the circuitry may be configured to provide respective virtual sound sources for the second passengers individually. Thus, the electronic device may be capable of simultaneously routing a voice to different passengers. For example, the voice may be provided to each passenger separately, or to a particular passenger or to a selected set of passengers.

According to the embodiments, the circuitry may be configured to transmit the audio signal in real time to another passenger.

According to the embodiments, the circuitry of the electronic device may be configured to generate the virtual sound source based on a 3D audio rendering operation. Spatial audio rendering techniques for the generation of spatial sound fields may create a virtual acoustic environment (also called 3D audio, or 3D virtual audio). Examples are the so called 5.1 or 7.1 systems, which are composed of 5 or 7 loudspeaker enclosures and one or two extra subwoofer, which are designed to reproduce the low frequency range of sound with a higher energy. In such systems mathematical algorithms are used to reproduce a sound field as exactly as possible.

A 3D audio rendering operation may for example be based on Wavefield synthesis. Wavefield synthesis techniques may be used to generate a sound field that gives the impression that an audio point source is located inside a predefined space. Such an impression can, for example, be achieved by using a Wavefield synthesis approach that drives a loudspeaker array such that the impression of a virtual sound source is generated.

According to the embodiments, the 3D audio rendering operation may be based on monopole synthesis. Monopole synthesis techniques may be used to generate a sound field that gives the impression that an audio point source is located inside a predefined space. Such an impression can, for example, be achieved by using a monopole synthesis is approach that drives a loudspeaker array such that the impression of a virtual sound source is generated.

According to the embodiments, the virtual sound source may have a directivity pattern. Directivity may for example be achieved by superimposing multiple monopoles. Directivity may describe the way a speaker's frequency response changes at off axis angles.

According to some embodiments, the electronic device controls a display device to present an image of the second passenger. The display device may share a display with other equipment inside the vehicle, such as an entertainment equipment or an existing satellite navigation system, or the vehicle may be provided with an individual display.

According to an embodiment, a Head-up display projects the face of a second passenger (e.g. rear seat passenger) to a first passenger (e.g. front sitting passenger) during communication.

According to the embodiments a vehicle audio system comprises an electronic device as described above, a microphone array, a speaker array, a user interface, and/or a sensor array that are connected to the electronic device. The system may for example comprise recording microphones in front of the passengers to record their voice which is then sent to a 3D rendering system, which is capable in rendering arbitrary 3D locations for the sound sources. The system may record the voice of the first passenger and transmit the recorded voice in real time to the second passengers, giving the impression that the first passenger interlocutor is facing the second passenger.

The embodiments also disclose a method to obtain an audio signal of a first passenger of a vehicle and to control a loudspeaker array to generate at least one virtual sound source that reproduces the audio signal obtained from the passenger, the virtual sound source being provided for a second passenger. The methods as described herein may also be implemented in some embodiments as a computer program causing a computer and/or a processor to perform the method, when being carried out on the computer and/or processor.

The embodiments also disclose a computer program to obtain an audio signal of a first passenger of a vehicle and to control a loudspeaker array to generate at least one virtual sound source that reproduces the audio signal obtained from the passenger, the virtual sound source being provided for a second passenger. In some embodiments, also a non-transitory computer-readable recording medium is provided that stores therein a computer program product, which, when executed by a processor, such as the processor described above, causes the methods described herein to be performed.

In Vehicle Communication Enhancement System

FIG. 1 schematically describes an embodiment of a vehicle audio system with an electronic device that improves passenger voice communication.

The vehicle audio system 100 comprises an electronic device 101 that is connected to a microphone array 110, a speaker array 111, a user interface 112, and a sensor array 113. The electronic device 101 may for example be an Electronic Control Unit (ECU) of the vehicle.

The electronic device 101 comprises a CPU 102 as processor, a data storage 103 and a data memory 104 (here a RAM). The data memory 104 is arranged to temporarily store or cache data and/or computer instructions for processing by the processor 102. The data storage 103 may for example record sensor data obtained from e.g. the microphone array 110. The electronic device 101 may execute software for a 3D audio rendering operation. In particular, the 3D audio rendering virtually places a sound source anywhere inside the vehicle, including behind, above or below a passenger.

The electronic device 101 further comprises an Ethernet interface 107, a Bluetooth interface 106, and a WLAN interface 105. These units 105, 106, 107 act as I/O interfaces for data communication with external devices. For example, a smartphone may be connected to the vehicle audio system by means of the Bluetooth interface 106 and/or the WLAN interface 105. Additional loudspeakers, microphones, and video cameras with Ethernet, WLAN or Bluetooth connection may be coupled to the electronic device 101 via these interfaces 105, 106, and 107.

The microphone array 110 may be composed of one or more microphones distributed inside a vehicle to obtain audio signals (e.g. voice) of passengers within the vehicle.

The user interface 112 is connected to the processor 102. The user interface 112 acts as a human-machine interface and allows for a dialogue between an administrator and the electronic system. A more detailed explanation is provided below in FIG. 8.

The sensor array 113 is connected to the processor 102 and the passenger seats. The sensor array 113 may consist of a pressure sensor, a temperature sensor and/or a video camera. The sensor array 113 may be configured to obtain the presence of passengers on the passenger seats in the vehicle. In the case where the sensor array 113 consists of one or more video cameras, it is further possible to obtain a head position and orientation of the passenger. Video cameras may be distributed over a predefined space, or a single camera can be used to obtain an image.

The vehicle audio system 100, by means of microphone array 110, receives audio data from passengers within the vehicle. The obtained audio signals (e.g. voice) are rendered to the speaker array 111 inside the vehicle.

It should be noted that the description above is only an example configuration. Alternative configurations may be implemented with additional or other sensors, storage devices, interfaces, or the like.

Virtual Sound Source

Figure 2:
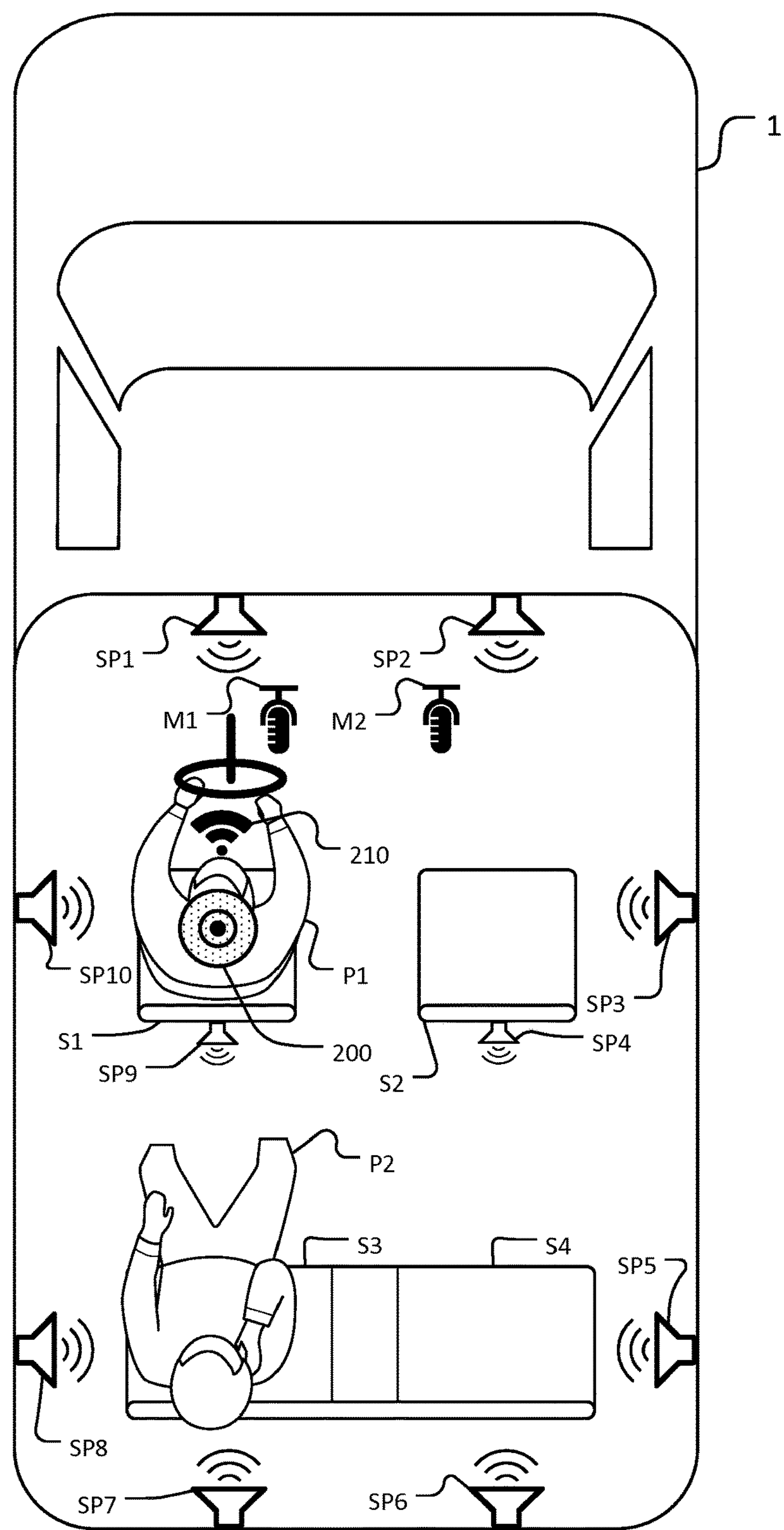
FIG. 2 schematically depicts a vehicle audio system with an electronic device that improves passenger voice communication by generating a virtual sound source.

FIG. 2 schematically depicts as an example, a vehicle audio system with an electronic device that improves passenger voice communication by generating a virtual sound source.

A vehicle 1 is equipped with a vehicle audio system and four seats S1 to S4. The front seats S1, S2 are provided for a driver P1 or a co-driver and the rear seats S3, S4 are provided for passengers at the rear seats S3, S4 of the vehicle. In vehicle 1, a passenger P2 is sitting on seat S3.

A microphone array (see 110 in FIG. 1) comprises two microphones M1, M2, which are located at the front seats S1, S2. The microphone M1 of the driver may be on the steering wheel and the microphone M2 of the co-driver may for example be located on the glove/storage compartment.

A loudspeaker array (see 111 in FIG. 1) of the electronic system 100 comprises loudspeakers SP1 to SP10 disposed within the vehicle 1. The loudspeakers SP1, SP2 are located at the instrument panel, the loudspeakers SP3, SP5, SP8, SP10 are located at the doors, the loudspeakers SP6, SP7 are located at the rear parcel shelf and the loudspeakers SP4, SP10 are located at the seat back board of the front seats S1, S2.

When the driver P1 speaks to passenger P2, the produced audio signal has a high directivity as indicated by the driver's directivity pattern 210. The human speech has a strong directivity so that the higher frequencies of the speech will be highly attenuated and thus the speech intelligibility is degraded.

In order to improve passenger voice communication, the vehicle audio system generates a virtual sound source 200 using techniques such as Wavefield synthesis (see FIG. 9 and corresponding description below). The algorithms for Wavefield synthesis are executed by an electronic device (see 101 in FIG. 1), e.g. an electronic control unit (ECU) located in the vehicle. The algorithms for Wavefield synthesis are configured to drive the loudspeaker array SP1 to SP10 of the vehicle audio system. By driving the loudspeaker array SP1 to SP10, the virtual sound source 200 is put at the location of the driver (speaker). The location of the virtual sound source 200 can be realized by predefined location or based on the real head position and orientation of the speaker (driver) that is obtained through a sensor, e.g. video camera. By putting the virtual sound source 200 at the location of the driver, the driver's directivity pattern 210 is altered and an impression is created that the driver is talking to the passenger P2 at exactly from the driver position as if his head was turned toward passenger P2. The original speech 210 and the virtual sound source 200 are overlaid so that the impression is created, that the audio signal (e.g. voice) is not amplified, but turning his head so that his speech can be understood clearly.

Using virtual sound sources such as virtual sound source 200 in a vehicle audio system as described above with regard to FIG. 2 allows generating audio signals that are spatially confined. Creating virtual sound sources can be seen as a form of creating virtual loudspeakers.

A virtual sound source 200 can be a monopole sound source as shown in FIG. 2 which radiates sound equally well in all directions. The simplest example of a monopole source would be a sphere whose radius alternately expands and contracts sinusoidally. It is also possible by using multiple monopole sound sources and algorithms such as Wavefield synthesis to create a directivity pattern for a virtual sound source (see FIG. 7 and corresponding description below).

Passenger-Individual Sound Sources

Figure 3:
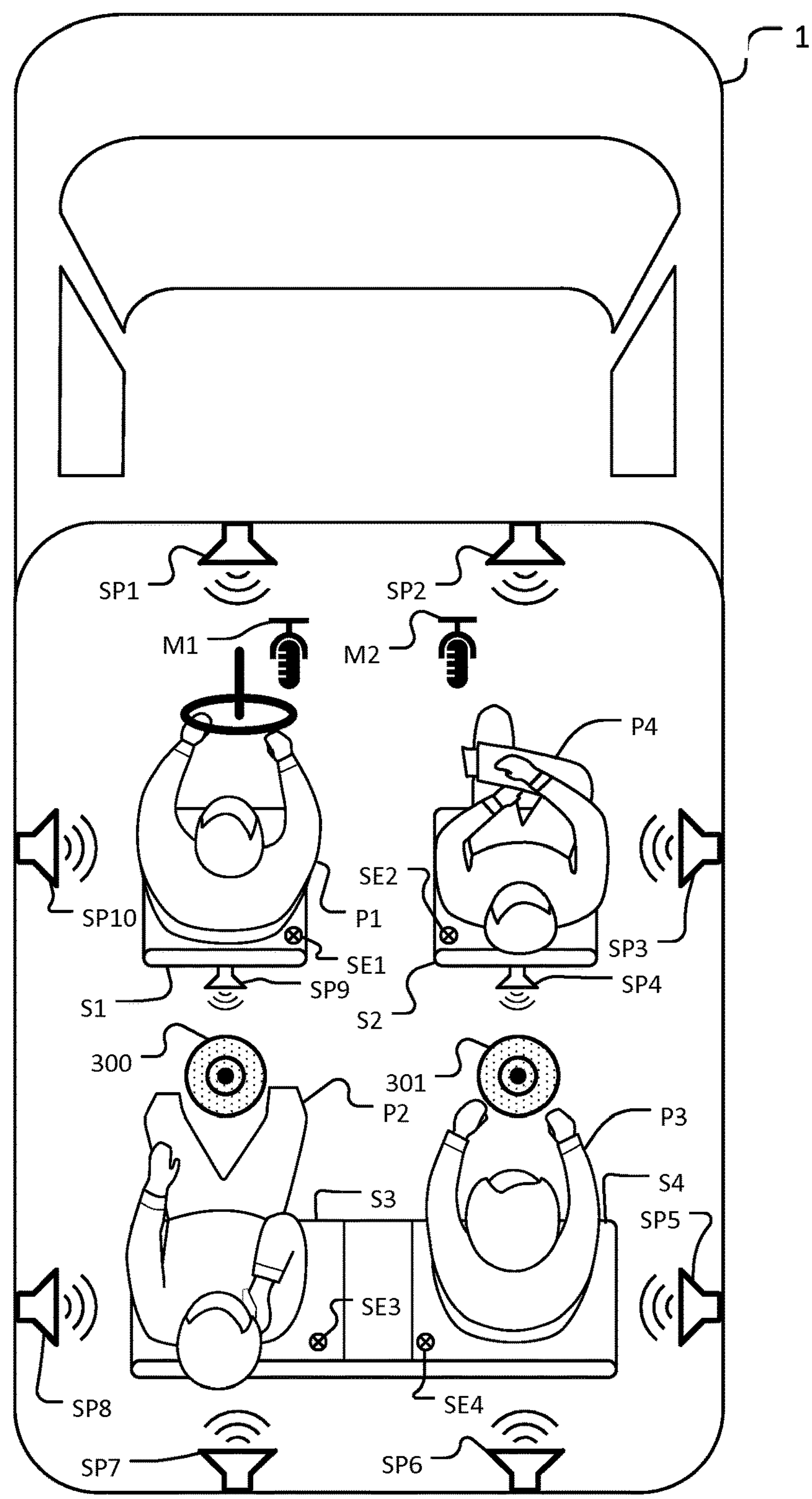
FIG. 3 schematically depicts a vehicle audio system with an electronic device that improves passenger voice communication by generating passenger-individual sound sources based on the presence of a passenger.

FIG. 3 schematically depicts as an example a vehicle audio system with an electronic device that improves passenger voice communication by generating passenger-individual sound sources based on the presence of a passenger.

A vehicle 1 is equipped with a vehicle audio system and four seats S1 to S4. The front seats S1, S2 are provided for a driver P1 and a co-driver P4 and the rear seats S3, S4 are provided for passengers P2 and P3.

The vehicle audio system comprises microphones M1 and M2 that constitute a microphone array, and loudspeakers SP1 to SP10 that constitute a loudspeaker array. In addition, the vehicle audio system comprises a sensor array that comprises four sensors SE1 to SE4 that are each arranged at the respective seats S1 to S4 of the vehicle 1. The sensors SE1 to SE4 may be any kind of sensors such as a pressure sensor capable of obtaining a respective presence of the passengers P1 to P4.

Based on the detected presence of the passengers P1, P2, P3, P4 in the vehicle, the vehicle audio system places an individual virtual sound source 300, 301 in a predefined location that is close to the respective passenger.

For example, as sensor SE3 detects that passenger P2 is sitting on seat S3, a virtual sound source 300 is disposed near passenger P2, e.g. 50 cm in front of seat S3 and 50 cm above the seating surface. As the virtual sound source 300 is located close to passenger P2, the loudness of the audio signal can be adapted so that the audio signal is primarily and clearly audible for passenger P2, but not prominent for passengers P1, P2, P4 who are located further away from the virtual sound source 300. Similarly, based on the presence of passenger P3 on seat S4 as detected by sensor SE4, the vehicle audio system places another virtual sound source 301 that is located close to passenger P3, e.g. 50 cm in front of seat S4 and 50 cm above the seating surface.

As the audio signal (e.g. voice of the driver) is emitted for each passenger P1, P2, P3, P4 by respective virtual sound sources 300, 301, each passenger can individually receive the audio signal.

Figure 4:
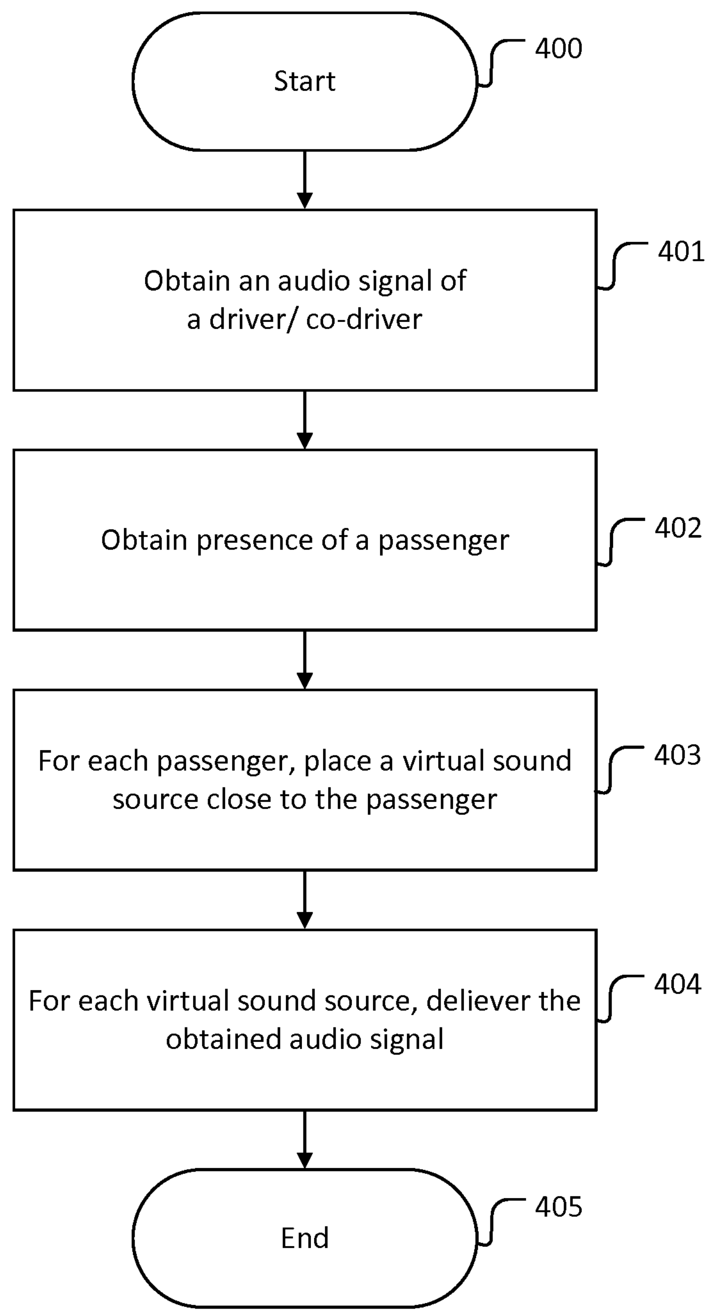
FIG. 4 schematically depicts a process that generates passenger-individual sound sources based on the presence of a passenger.

FIG. 4 depicts as an example, a process that generates passenger-individual virtual sound sources (300, 301 in FIG. 3) based on the presence of a passenger. At 400, the process starts. At 401, an audio signal of a diver P1 is obtained from a microphone M1, M2. At 402, the presence of the passengers P2 and, respectively, P3 is obtained by a sensor array (here, SE3 and SE4 in FIG. 3) in the vehicle 1. At 403, for each passenger P2 and P3, a virtual sound source is placed based on the presence of the passengers P2 and P3. At 404, for each virtual sound source, an audio signal is generated that corresponds to the recorded voice of the driver P1. At 405, the process ends.

Figure 5:
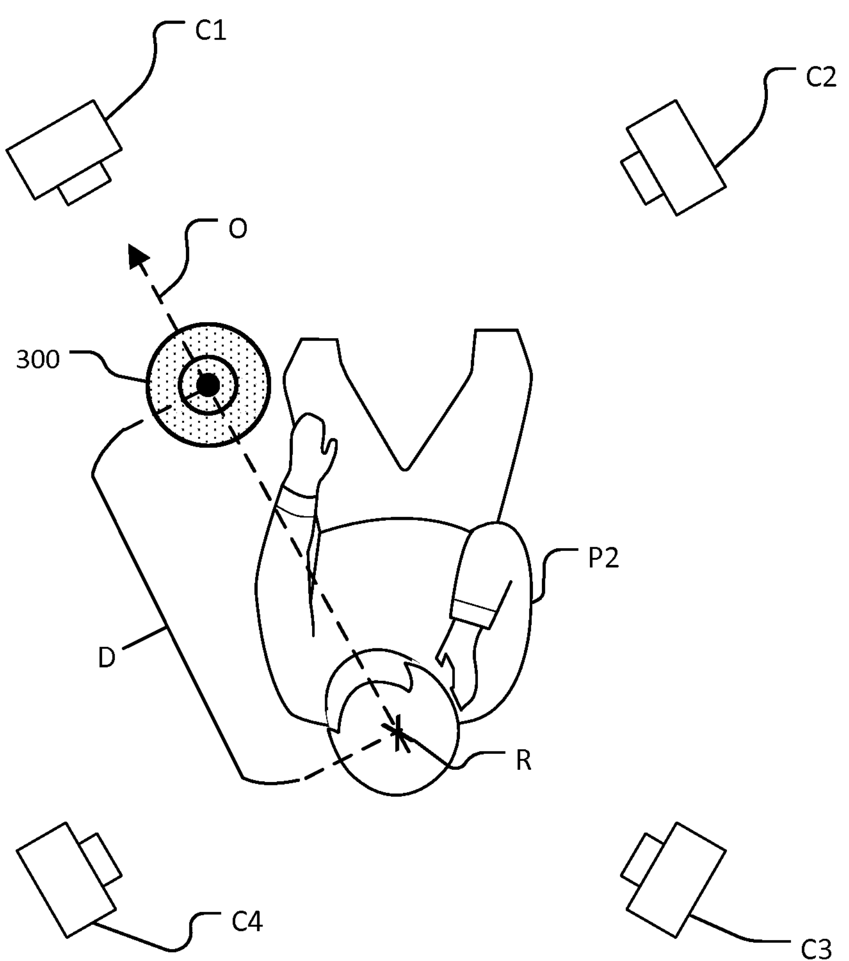
FIG. 5 schematically depicts a vehicle audio system with an electronic device that improves passenger voice communication by generating passenger-individual sound sources based on the position of a passenger.

FIG. 5 depicts another example for a vehicle audio system with an electronic device that improves passenger voice communication by generating passenger-individual sound sources based on the position of a passenger.

Video cameras C1 to C4 are used to obtain a positions of a passenger P2 (for example passenger P2 in FIG. 3). Video cameras C1 to C4 obtain an image from passenger P2, and by aid of a face recognition algorithms the head position R and orientation O of the passenger is obtained. Based on this information the vehicle audio system tracks the position R and orientation O of the head of passenger P2. Techniques for face recognition and determining the position and the orientation of the head of passenger P2 are known to the skilled person. Such techniques may be based on recognition of features of a face such as mouth, nose, eyes and/or ears. Further, the vehicle audio system places the virtual sound sources 300 in a predefined distance D in front of the face of the passenger P2, e.g. the distance D may be 50 cm away from the noise.

Figure 6:
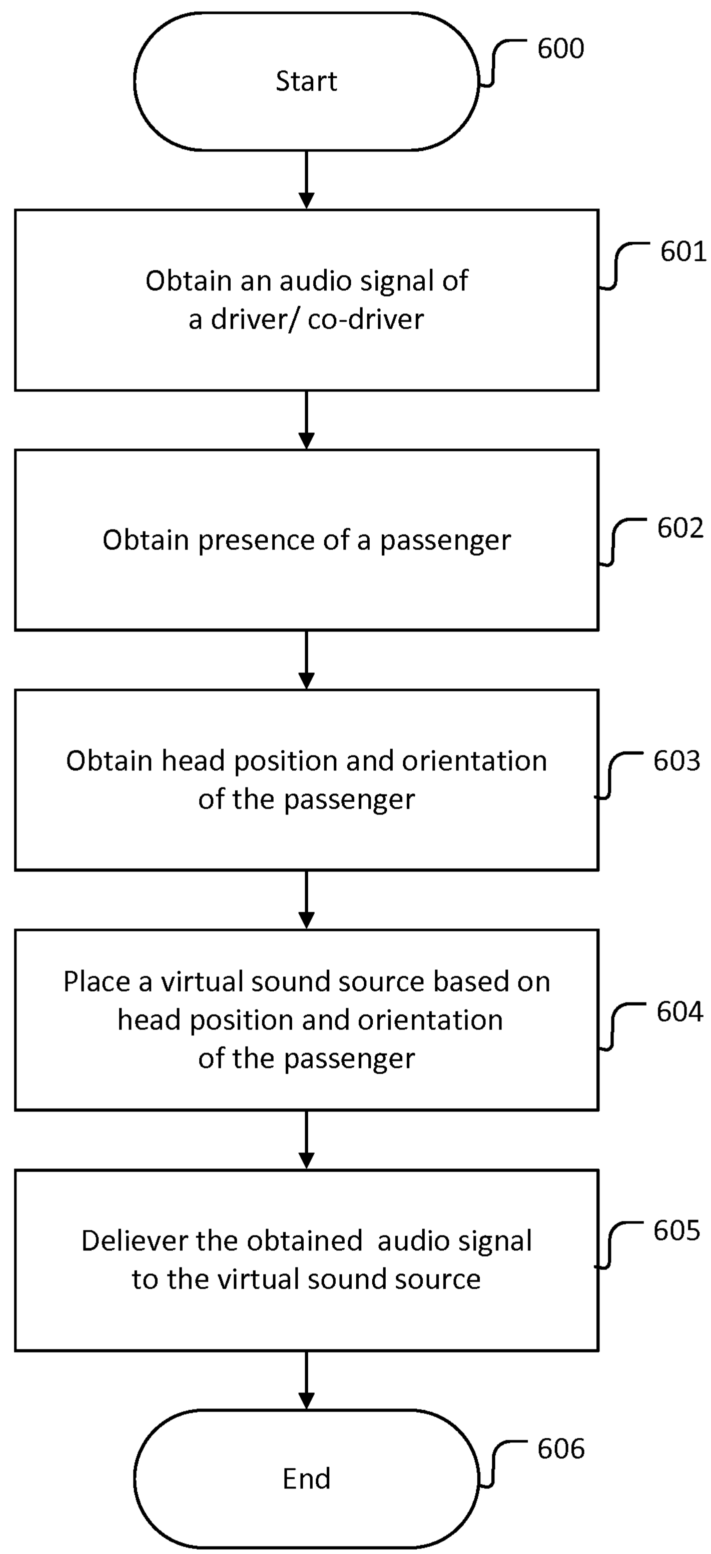
FIG. 6 schematically depicts a process that generates passenger-individual sound sources based on the position of a passenger.

FIG. 6 depicts as an example, a process that generates passenger-individual virtual sound sources (300 in FIG. 5) based on the position of a passenger. At 600, the process starts. At 601, an audio signal of a diver P1 is obtained from a microphone M1, M2. At 602, the presence of the passengers P2 is obtained by a sensor array in the vehicle 1. Pressure sensors, radar or video cameras may be used to obtain the presence of the passenger P2. At 603, an image of the passenger P2 is obtained via video cameras C1 to C4, a head position R and orientation O of the passenger P2 is obtained based on the image data that is obtain through the video cameras C1 to C4. At 604, based on the head position R and orientation O of the passenger P2 a virtual sound source is generated. At 605, for the virtual sound source an audio signal is generated. At 606, the process ends.

Figure 7:
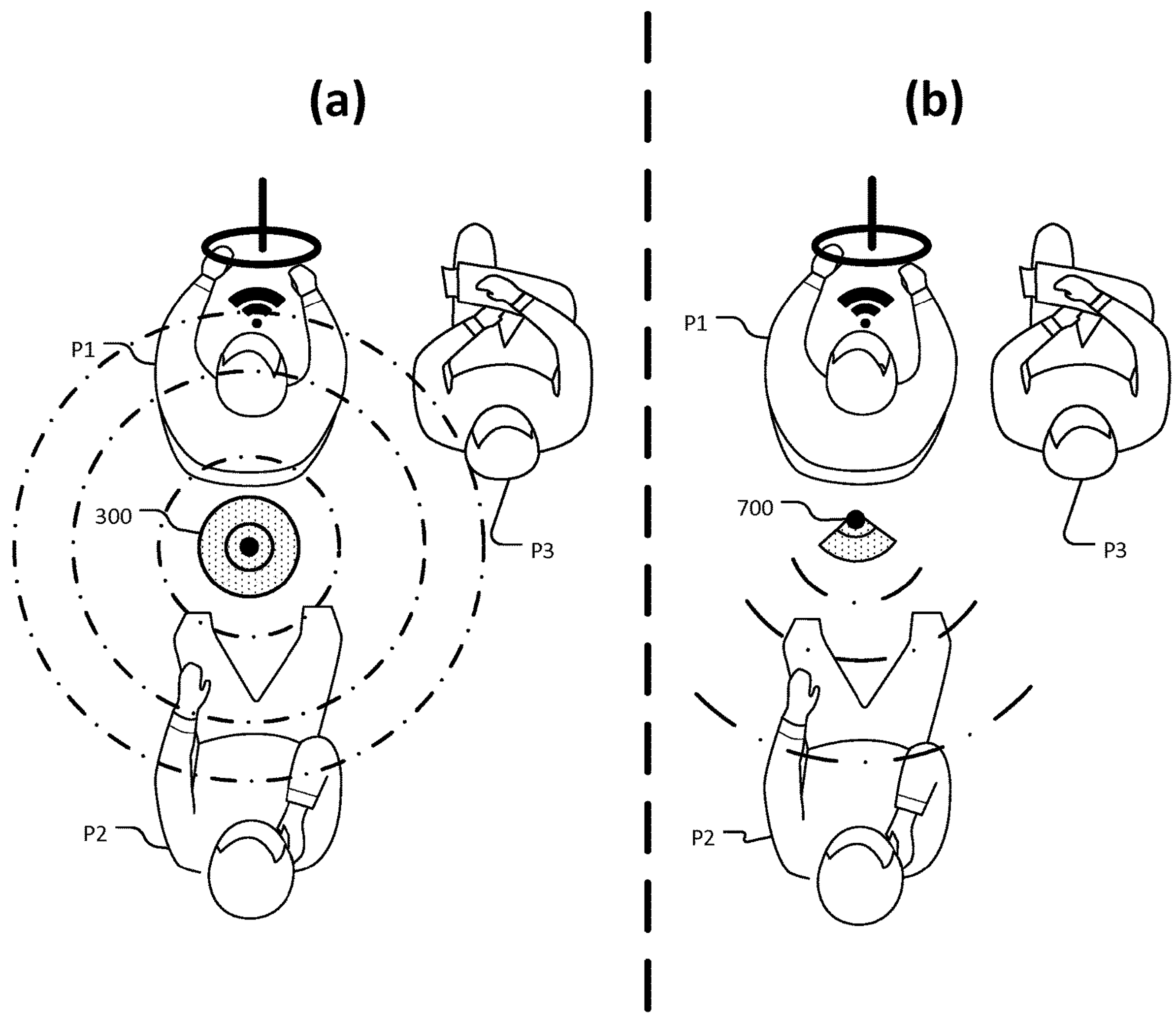
FIG. 7 schematically depicts a vehicle audio system with an electronic device that improves passenger voice communication by generating a monopole virtual sound source (a) or a directional virtual sound source (b)

FIG. 7 depicts another example for a vehicle audio system with an electronic device that improves passenger voice communication by generating a monopole virtual sound source (a) or a directional virtual sound source (b).

FIG. 7*a* is based on FIG. 3 where an audio signal (e.g. voice) of a driver P1 is delivered with a monopole virtual sound source 300. The monopole sound radiates sound equally well in all directions. Therefore, not only passenger P2 but also other passengers P4 may receive the audio signal form the virtual sound source. The passenger P4 may be disturbed by the audio signal, which is generated by the monopole virtual sound source 300.

FIG. 7*b* depicts another example, wherein a virtual sound source 700 has a directivity pattern. A passenger P2 is receiving an audio signal from the virtual sound source 700 with a directivity pattern. The virtual sound source 700 provides the impression as if the driver P1 has turned his head, and is talking to the passenger P2. As the virtual sound source 700 has a directivity pattern, the generated audio signal of the virtual sound source 700 does not disturb the other passenger P4. The directivity of the virtual sound source 700 may be realized by placing multiple monopole sound sources based on the Wavefield synthesis.

FIGS. 2 to 7 are based on the assumption that the audio source is generated at a front seat S1, S2 and supplied to a rear seat S3, S4, but it is also possible to change the communication direction from the rear seats S3, S4 to the front seats S1, S2. In the case where rear-to-front communication is allowed, microphones may also be provided on the rear seats S3, S4. The number of passengers and the type of transport is also not limited. Further, a car is provided as an example, but other transportation means such as an airplane, a train, a bus or a ship are possible.

Improving passenger voice communication by generating a virtual sound source as described in the embodiments above is particularly advantageous for passengers sitting on the rear seats. Usually, when driving, a passenger sitting on the rear seat leans forward and tries to place the head in between the two front seats, if the passenger wants to say something to the front passengers. A 4th passenger on the 2nd rear seat does not understand anything in this case. If the vehicle audio system improves passenger voice communication by generating virtual sound sources for passengers on the rear seats, cumbersome movements are not necessary anymore as every passenger in the car can understand each other.

Transporting Phone Calls to Passengers Using Virtual Sound Sources

Further, the vehicle audio system may also be applied to a phone call. If there is a phone call to the driver in the car, today only the driver is able to participate in this call (because of the directivity of the mic). The following embodiment provides a vehicle audio system that allows other passengers to participate with the call.

During a phone call, the vehicle audio system identifies the actual speaker, captures the voice of the actual speaker by means of a microphone array (110 in FIG. 1) of the vehicle audio system and routes the speaker's voice also into the call. The caller's voice is rendered by the vehicle audio system using a virtual sound source as described in the embodiments above.

The caller's voice may be presented to the passengers from a direction that depends on the caller's phone number or his identification. For example, if the supervisor of the speaker in the vehicle is calling, his voice may be reproduced using a virtual sound source that is positioned in such a way that the voice appears to come from a top direction. If the speaker's wife is calling, by choosing the position of the virtual sound source appropriately, her speaking direction may be configured to be any direction that the driver pre-programmed into the audio-system's settings, etc.

User Interface

Figure 8:
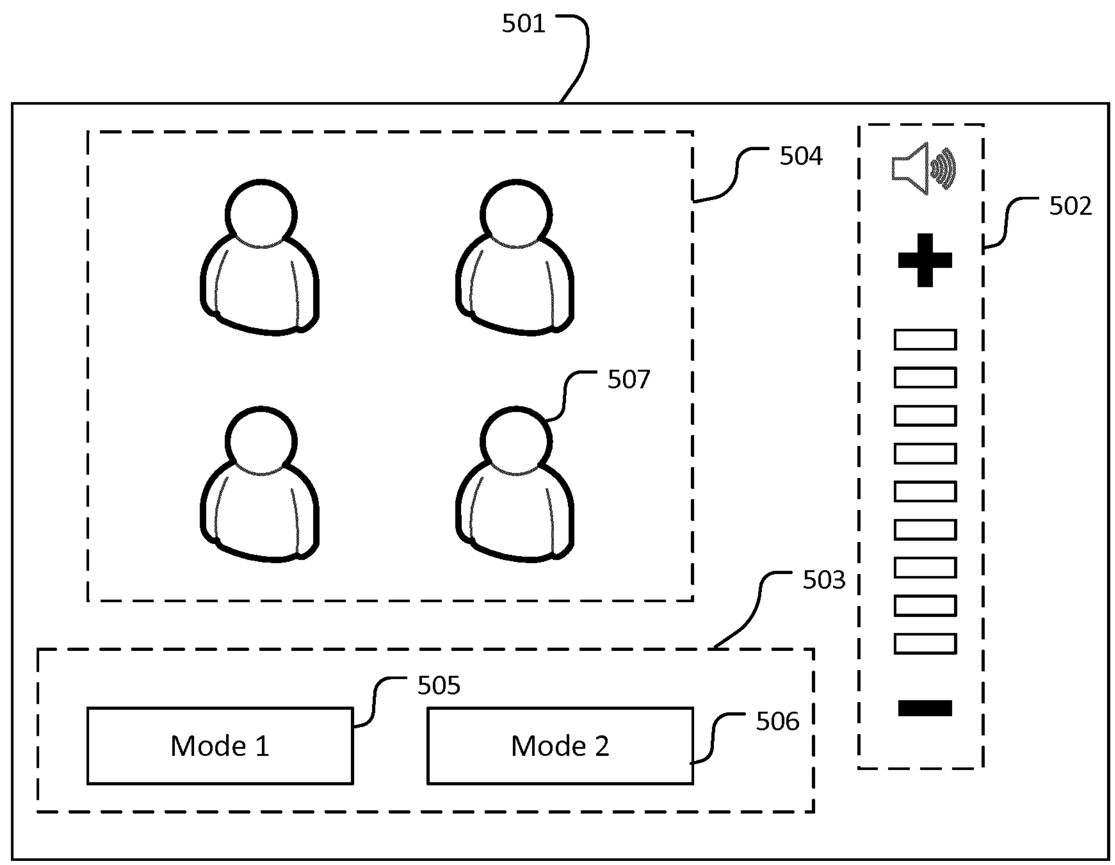
FIG. 8 schematically describes a user interface of an vehicle audio system that improves passenger voice communication.

FIG. 8 schematically describes as an example, a user interface (112 in FIG. 1) of a vehicle audio system that improves passenger voice communication.

The user interface 501 includes a volume control unit 502, a mode control unit 503, and a passenger selection unit 504. The volume control unit 502 is configured to adjust the volume of the speaker. The mode control unit 503 includes a first mode selection unit 505 and a second mode selection unit 506. By selecting the first mode 505, a general volume control can be performed, and by selecting the second mode 506, individual adjustment is possible. Furthermore, an audio signal from a passenger, in this case from the driver P1, can also be transmitted to all passengers within the vehicle, or the driver can select to which passenger he would like to route his voice. For example, the driver P1 may select the first mode 505 of the mode control unit 503 to provide his voice to all passengers. For individual communication, the driver P1 may select the second mode 506, select a passenger icon 507 of the selection unit 504, and route his voice to the particular passenger.

FIG. 8 is based on the assumption that the user interface is provided in the dashboard for persons sitting in the front of the vehicle.

Modern cars are equipped with entertainment displays for the passengers in the rear seats. Such entertainment displays are typically arranged in the back sides of the front seats. Using such displays that are arranged for the passengers at the back of the vehicle, a vehicle audio system may also present the face of a speaking driver or co-driver to the passengers in the back.

Still further, head-up displays may be used to project the face of the rear seat passengers to the front-sitting passengers when they are talking. As humans like to have face-to-face contact when speaking, this feature of the vehicle audio system may improve passenger voice communication.

System for Digitalized Monopole Synthesis in the Case of Integer Delays

Figure 9:
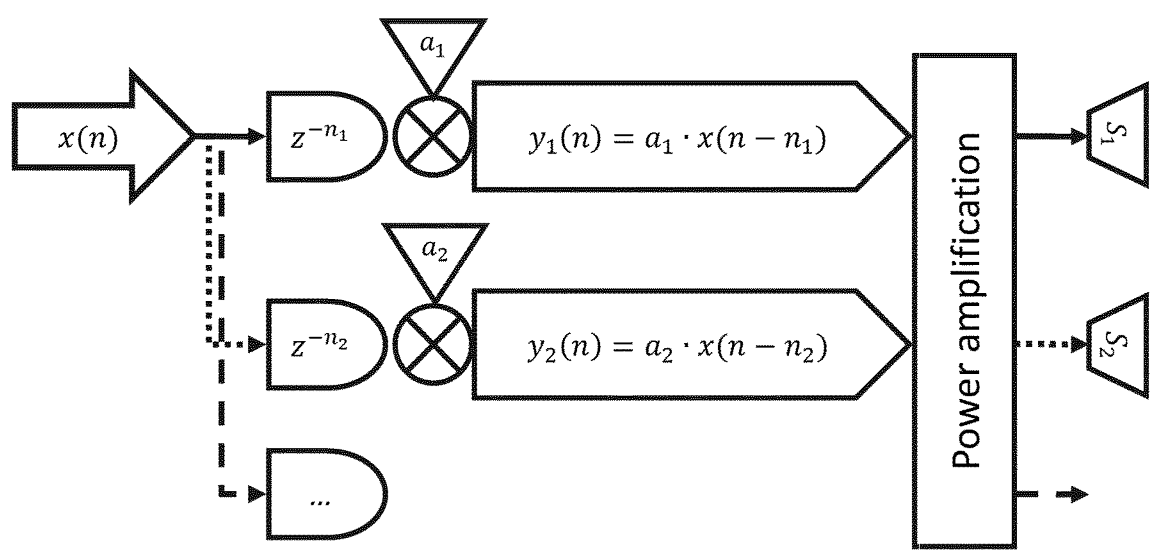
FIG. 9 provides a schematic diagram of a system applying digitalized monopole synthesis algorithm.

FIG. 9 provides an embodiment of a 3D audio rendering that is based on a digitalized Monopole Synthesis algorithm. The theoretical background of this technique is described in more detail in patent application US 2016/0037282 A1 that is herewith incorporated by reference.

The technique which is implemented in the embodiments of US 2016/0037282 A1 is conceptually similar to the Wavefield synthesis, which uses a restricted number of acoustic enclosures to generate a defined sound field. The fundamental basis of the generation principle of the embodiments is, however, specific, since the synthesis does not try to model the sound field exactly but is based on a least square approach.

A target sound field is modelled as at least one target monopole placed at a defined target position. In one embodiment, the target sound field is modelled as one single target monopole. In other embodiments, the target sound field is modelled as multiple target monopoles placed at respective defined target positions. For example, each target monopole may represent a noise cancelation source comprised in a set of multiple noise cancelation sources positioned at a specific location within a space. The position of a target monopole may be moving. For example, a target monopole may adapt to the movement of a noise source to be attenuated. If multiple target monopoles are used to represent a target sound field, then the methods of synthesizing the sound of a target monopole based on a set of defined synthesis monopoles as described below may be applied for each target monopole independently, and the contributions of the synthesis monopoles obtained for each target monopole may be summed to reconstruct the target sound field.

A source signal x(n) is fed to delay units labelled by $z^{-n_p}$ and to amplification units $a_p$, where p=1, . . . , N is the index of the respective synthesis monopole used for synthesizing the target monopole signal. The delay and amplification units according to this embodiment may apply equation (117) of reference US 2016/0037282 A1 to compute the resulting signals $y_p$ (n)=$s_p$ (n) which are used to synthesize the target monopole signal. The resulting signals $s_p$ (n) are power amplified and fed to loudspeaker $S_p$.

In this embodiment, the synthesis is thus performed in the form of delayed and amplified components of the source signal x.

According to this embodiment, the delay $n_p$ for a synthesis monopole indexed p is corresponding to the propagation time of sound for the Euclidean distance $r=R_{p0}=|r_p-r_o|$ between the target monopole $r_o$ and the generator $r_p$.

Further, according to this embodiment, the amplification factor $$a_p = \frac{\rho c}{R_{p0}}$$

is inversely proportional to the distance $r=R_{p0}$.

In alternative embodiments of the system, the modified amplification factor according to equation (118) of reference US 2016/0037282 A1 can be used.

It should be recognized that the embodiments describe methods with an exemplary ordering of method steps. The specific ordering of method steps is however given for illustrative purposes only and should not be construed as binding. For example the ordering of process steps 401 and 402 in FIG. 4 and/or the ordering of process steps 601 and 602 in FIG. 6 may be exchanged. Other changes of the ordering of method steps may be apparent to the skilled person.

It should also be recognized that the division of units 102 to 107 in FIG. 1 is only made for illustration purposes and that the present disclosure is not limited to any specific division of functions in specific units. For instance, the CPU 102 could be implemented by a respective programmed processor, field programmable gate array (FPGA) and the like.

A method for controlling an electronic device, discussed above, can also be implemented as a computer program causing a computer and/or a processor, to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An electronic device (101) comprising circuitry configured to obtain an audio signal of a first passenger (P1) of a vehicle (1) and to control a loudspeaker array (111; SP1-SP10) to generate at least one virtual sound source (200; 300, 301; 700) that reproduces the audio signal obtained from the first passenger (P1), the virtual sound source (200; 300, 301; 700) being provided for a second passenger (P2, P3, P4).

(2) The electronic device (101) of (1), wherein the electronic device (101) is configured to obtain the audio signal of the first passenger (P1) from one or more microphones (110; M1, M2) located in the vehicle (1).

(3) The electronic device (101) of (1) or (2), wherein the circuitry is configured to provide the virtual sound source (300, 301) at the location of the first passenger (P1).

(4) The electronic device (101) of (3), wherein the virtual sound source (200) is configured to alter a directivity pattern of the first passenger's (P1) voice to give the impression that the first passenger (P1) has turned his head.

(5) The electronic device (101) of anyone of (1) to (4), wherein the circuitry is configured to provide the virtual sound source (300, 301) for the second passenger (P2, P3) based on the presence of the second passenger (P2, P3) at a seat (S3, S4) of the vehicle (1).

(6) The electronic device (101) of (5), wherein the circuitry is configured to obtain presence data from a sensor (SE3, SE4) that is located at the seat (S3, S4) of the second passenger (P2, P3).

(7) The electronic device (101) of anyone of (1) to (6), wherein the circuitry is configured to provide the virtual sound source (300, 301) for the second passenger (P2, P3) based on the position of the second passenger (P2, P3).

(8) The electronic device (101) of anyone of (1) to (7), wherein the circuitry is configured to provide the virtual sound source (300, 301) for the second passenger (P2, P3) based on the position (R) and orientation (O) of the head of the second passenger (P2, P3).

(9) The electronic device (101) of anyone of (1) to (8), wherein the circuitry is configured to obtain head position and/or orientation data of the second passenger (P2, P3) from a video camera (C1-C4).

(10) The electronic device (101) of anyone of (1) to (9), wherein the circuitry is configured to position the virtual sound source (300, 301) for the passenger (P2, P3) in a predefined distance (D) from the head of the passenger (P2).

(11) The electronic device (101) of anyone of (1) to (10), wherein the circuitry is configured to provide virtual sound sources for passengers individually.

(12) The electronic device (101) of anyone of (1) to (11), wherein the circuitry is configured to transmit the audio signal in real time to another passenger (P1, P2, P3, P4).

(13) The electronic device (101) of anyone of (1) to (12), wherein the circuitry of the electronic device (100) is configured to generate the virtual sound source based on a 3D audio rendering operation.

(14) The electronic device (101) of (11), wherein the 3D audio rendering operation is based on Wavefield synthesis.

(15) The electronic device (101) of (11), wherein the 3D audio rendering operation is based on monopole synthesis.

(16) The electronic device (101) of anyone of (1) to (14) or (15), wherein the virtual sound source (700) has directivity pattern.

(17) The electronic device (101) of anyone of (1) to (14) or (15), controls a display device to present an image of the second passenger (P2, P3).

(18) A vehicle audio system (100) comprising the electronic device (101) of claim 1, and a microphone array (110), a speaker array (111), a user interface (112), and/or a sensor array (113) that are connected to the electronic device (101).

(19) A method to obtain an audio signal of a first passenger (P1) of a vehicle (1) and to control a loudspeaker array (111; SP1-SP10) to generate at least one virtual sound source (200; 300, 301; 700) that reproduces the audio signal obtained from the passenger (P1), the virtual sound source (200; 300, 301; 700) being provided for a second passenger (P2, P3, P4).

(20) A computer program to obtain an audio signal of a first passenger (P1) of a vehicle (1) and to control a loudspeaker array (111; SP1-SP10) to generate at least one virtual sound source (200; 300, 301; 700) that reproduces the audio signal obtained from the passenger (P1), the virtual sound source (200; 300, 301; 700) being provided for a second passenger (P2, P3, P4).

The invention claimed is:

1. An electronic device comprising:

circuitry configured to obtain an audio signal of a first passenger of a vehicle and to control a loudspeaker array to generate at least one virtual sound source that reproduces the audio signal obtained from the first passenger, the virtual sound source being provided for a second passenger; and alter a directivity pattern of the first passengers voice to give the impression that the first passenger has turned his head.

2. The electronic device of claim 1, wherein the electronic device is configured to obtain the audio signal of the first passenger from one or more microphones located in the vehicle.

3. The electronic device of claim 1, wherein the circuitry is configured to provide the virtual sound source at the location of the first passenger.

4. The electronic device of claim 1, wherein the circuitry is configured to provide the virtual sound source for the second passenger based on the presence of the second passenger at a seat of the vehicle.

5. The electronic device of claim 4, wherein the circuitry is configured to obtain presence data from a sensor that is located at the seat of the second passenger.

6. The electronic device of claim 5, wherein the circuitry is configured to obtain head position and/or orientation data of the second passenger from a video camera.

7. The electronic device of claim 1, wherein the circuitry is configured to provide the virtual sound source for the second passenger based on the position of the second passenger.

8. The electronic device of claim 7, wherein the circuitry is configured to position the virtual sound source for the passenger in a predefined distance from the head of the passenger.

9. The electronic device of claim 1, wherein the circuitry is configured to provide the virtual sound source for the second passenger based on the position and orientation of the head of the second passenger.

10. The electronic device of claim 1, wherein the circuitry is configured to provide virtual sound sources for passengers individually.

11. The electronic device of claim 10, wherein the 3D audio rendering operation is based on Wavefield synthesis.

12. The electronic device of claim 10, wherein the 3D audio rendering operation is based on monopole synthesis.

13. The electronic device of claim 1, wherein the circuitry is configured to transmit the audio signal in real time to another passenger.

14. The electronic device of claim 1, wherein the circuitry of the electronic device is configured to generate the virtual sound source based on a 3D audio rendering operation.

15. A vehicle audio system comprising the electronic device of claim 1, and a microphone array, a speaker array, a user interface, and/or a sensor array that are connected to the electronic device.

16. The electronic device of claim 1, wherein the circuitry is configured to:

receive an output from a plurality of sensors indicating the presence of at least the first passenger, the second passenger and a third passenger in the vehicle; and alter a directivity pattern of the first passenger's voice to give the impression that the first passenger has turned his head to speak only to the second passenger.

17. The electronic device of claim 1, wherein the circuitry is configured to control the loudspeaker array to not reproduce the first passenger's voice in a zone corresponding to the third passenger.

18. The electronic device of claim 1, wherein the circuitry is configured to:

control a display to display a user interface that includes icons corresponding to at least a first mode and a second mode, and icons corresponding to the first passenger, the second passenger and the third passenger;

in a case of receiving a user input selecting the first mode, control the loudspeaker array to generate a virtual sound source for both the second passenger and the third passenger; and in a case of receiving a user input selecting the second mode and one of the plurality of icons, control the loudspeaker array to generate a virtual sound source having a directivity pattern directed to only the passenger corresponding to the one of the plurality of icons.

19. A method comprising:

obtaining an audio signal of a first passenger of a vehicle and to control a loudspeaker array to generate at least one virtual sound source that reproduces the audio signal obtained from the passenger, the virtual sound source being provided for a second passenger; and altering a directivity pattern of the first passenger's voice to give the impression that the first passenger has turned his head.

20. A non-transitory computer readable medium including a computer program, which when executed by circuitry, causes the circuitry to:

obtain an audio signal of a first passenger of a vehicle and to control a loudspeaker array to generate at least one virtual sound source that reproduces the audio signal obtained from the passenger, the virtual sound source being provided for a second passenger; and alter a directivity pattern of the first passenger's voice to give the impression that the first passenger has turned his head.

* * * * *